United States Patent

Veghte et al.

Patent Number: 5,825,329
Date of Patent: Oct. 20, 1998

[54] MODULATED BACKSCATTER MICROSTRIP PATCH ANTENNA

[75] Inventors: Richard L. Veghte, Rio Rancho; Curtis L. Carrender, Santa Fe, both of N. Mex.

[73] Assignee: Amtech Corporation, Dallas, Tex.

[21] Appl. No.: 687,089

[22] Filed: Jul. 23, 1996

Related U.S. Application Data

[63] Continuation of Ser. No. 134,862, Oct. 4, 1993, abandoned, which is a continuation of Ser. No. 395,641, Feb. 28, 1995, abandoned.

[51] Int. Cl.$^6$ ............................................. H01Q 1/38
[52] U.S. Cl. .................................. 343/700 MS; 343/876; 340/572; 342/51
[58] Field of Search ........................... 343/700 MS, 742, 343/867, 876, 895; 340/572; 342/51; H01Q 1/38

[56] References Cited

U.S. PATENT DOCUMENTS

| | | | |
|---|---|---|---|
| 4,075,632 | 2/1978 | Baldwin et al. | 340/572 X |
| 4,296,414 | 10/1981 | Beyer et al. | 333/103 X |
| 4,360,810 | 11/1982 | Landt | 340/572 X |
| 4,471,344 | 9/1984 | Williams | 340/572 |
| 4,736,207 | 4/1988 | Siikarla et al. | 343/700 MS |
| 4,737,793 | 4/1988 | Munson et al. | 343/700 MS |
| 4,739,328 | 4/1988 | Koelle et al. | 342/44 |
| 4,786,907 | 11/1988 | Koelle | 342/51 |
| 4,804,961 | 2/1989 | Hane | 342/125 |
| 4,908,629 | 3/1990 | Apsell et al. | 342/457 |
| 4,912,481 | 3/1990 | Mace et al. | 343/700 MS |
| 4,918,296 | 4/1990 | Fujisaka | 235/380 |
| 5,030,940 | 7/1991 | Siikarla | 343/875 X |
| 5,053,774 | 10/1991 | Schuermann | 342/44 |
| 5,099,226 | 3/1992 | Andrews | 340/572 |
| 5,103,222 | 4/1992 | Esch et al. | 340/572 X |
| 5,119,099 | 6/1992 | Haruyama et al. | 342/51 |
| 5,122,809 | 6/1992 | Haruyama et al. | 343/700 MS |
| 5,173,711 | 12/1992 | Takeuchi et al. | 343/700 MS |
| 5,201,065 | 4/1993 | Niehenke | 343/700 MS |
| 5,216,419 | 6/1993 | Fujisaka et al. | 340/572 X |
| 5,231,273 | 7/1993 | Caswell et al. | 235/385 |
| 5,241,160 | 8/1993 | Bashan et al. | 235/380 |
| 5,512,911 | 4/1996 | Oprea | 343/700 MS |

FOREIGN PATENT DOCUMENTS

| | | | |
|---|---|---|---|
| 2663145 | 12/1991 | France | 340/572 |
| 3143915 | 5/1983 | Germany | 343/700 MS |
| PCT/US96/ 16977 | 10/1996 | WIPO . | |

OTHER PUBLICATIONS

Hall et al., *The ARRL Antenna Book*, (no month) 1993, pp. 2–6—2–10.

*Primary Examiner*—Hoanganh T. Le
*Attorney, Agent, or Firm*—Fish & Richardson P.C.

[57] ABSTRACT

The invention provides a microstrip patch antenna for emitting backscatter-modulated signals in response to a received signal. The antenna has two segments that are connected together by a switch. When the switch is ON, the antenna is a full wave length antenna with its two segments out-of-phase with each other, thus producing minimal backscatter. When the switch is OFF, the two segments of the antenna act in concert with each other to produce a backscatter-modulated signal. Multiple pairs of such antennas can be connected together to make a single antenna with increased signal power.

16 Claims, 3 Drawing Sheets

MODULATED BACKSCATTER MICROSTRIP PATCH ANTENNA

This is a continuation of application Ser. No. 08/134,862, filed Oct. 4, 1993, now abandoned, which is a continuation of application Ser. No. 08/395,641, filed Feb. 28, 1995, now abandoned.

This invention relates to an antenna system in a transponder for modulating RF signals from a reader and reflecting the modulated signals back to the reader to pass information from the transponder to the reader, and for receiving RF signals from the reader and decoding data to be written into the transponder's memory.

BACKGROUND OF THE INVENTION AND PRIOR ART

Systems for remote identification of objects are being used for many purposes, such as identifying vehicles passing through a toll station on a highway or identifying cargo containers located on board a ship. Such systems use RF signals to communicate information between a reader apparatus and a transponder attached to the object. Some systems include both "read" and "write" functions; that is, the reader apparatus can read information previously stored in the transponder's memory and the transponder can also write new information into the its memory in response to signals from the reader.

Each transponder has an individual code containing information related to and identifying the associated container. The reader sends an RF signal to the remote transponder. An antenna in the transponder receives the signal from the reader, backscatter-modulates the received signal with data temporarily or permanently stored in the transponder (such as data indicating the identity and contents of the object to which the transponder is attached), thereby producing a sequence of signals in accordance with the transponder's individual code, and reflects this modulated signal back to the reader to pass the information contained in the transponder to the reader. The reader decodes these signals to obtain the information from the transponder. Likewise, the transponder may decode signals received from the reader and write information to the transponder's memory. Except for the novel features of this invention, the details of these transponders and readers are not described herein because they have been previously described in one or more of U.S. Pat. Nos. 4,739,328; 4,782,345; 4,786,907; 4,816,839; 4,835,377; and 4,853,705 which are hereby incorporated by reference.

The systems now in use have had certain difficulties. One difficulty has resulted from the limited range of transmission of the identifying signals from the transponder to the reader. Another related difficulty has resulted from RF interference. Interference produced by the transponder's antenna can prevent the reader from properly detecting the pattern of binary 1's and 0's in the sequence individually identifying the object. Additionally, interference produced by the transponder's logic circuitry can prevent accurate decoding of data to be written into the transponder's memory.

A considerable effort has been devoted over a number of years to eliminate or at least minimize these problems. In spite of these efforts, such problems have persisted. The range of communications between the reader and the transponder continues to be limited by the effects of noise. This has tended to limit the ranges of uses to which systems for identifying objects can be applied.

BRIEF DESCRIPTION OF THE INVENTION

The transponder antenna system of this invention provides an enhanced signal power level in comparison to the transponders of the prior art. As a result, the effective range of the transponder is increased relative to transponders of the prior art. Additionally, as compared to transponders of the prior art, the transponder antenna system of this invention reduces the amount of undesired backscatter that can interfere with detection and identification by a reader and improves the transponder's ability to detect data to be written into the transponder's memory.

Briefly, the invention provides a microstrip patch antenna for emitting backscatter-modulated signals in response to a received signal. The antenna has two segments that are connected together by a switch. When the switch is ON, the antenna is a full wave length antenna with its two segments out-of-phase with each other, thus producing minimal backscatter. When the switch is OFF, the two segments of the antenna act in concert with each other to produce a backscatter-modulated signal. Multiple pairs of such antennas can be connected together to make a single antenna with increased signal power.

DETAILED DESCRIPTION OF A PREFERRED EMBODIMENT OF THE INVENTION

Figure 1:
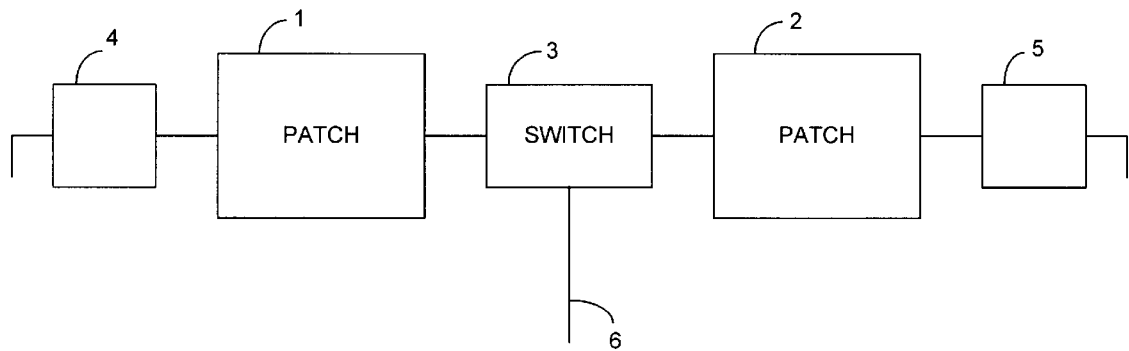
FIG. 1 is a schematic diagram of the preferred embodiment of the invention.

Referring to FIG. 1, patches 1 and 2 are microstrip patch antennas, preferably substantially the same (but not necessarily). The preferred embodiment uses patches having linear polarization, although patches having circular polarization also may be used. Patches 1 and 2 are connected through switch 3, which in the preferred embodiment is a GaAs FET switch well known in the art. Other switches may be used, for example, MOS or bipolar transistor switches or voltage-controlled diodes. Switch 3 is controlled by a modulating signal received through line 6. This modulating signal is provided by the integrated circuit in the transponder (not shown), which also is used for data storage and signal generation.

As shown in FIG. 1, patches 1 and 2 are connected to switch 3 on opposite sides; i.e., switch 3 is connected to patch 1 on its right side and to patch 2 on its left side. Therefore when switch 3 is on, each patch is fed with a signal that is 180 degrees out of phase with the signal to the other patch. As a result, patches 1 and 2 are connected together to produce a full wave length antenna with its two halves out of phase with each other. In the preferred embodiment, patches 1 and 2 are each one-half wave length antennas, but other fractional wave length antennas, such as one-quarter wave length antennas, also may be used. Because patches 1 and 2 are out-of-phase with each other, a "null" is created, insuring that no significant signal can be reflected back to the reader. Thus, when switch 3 is ON, minimal backscatter is produced. This represents a significant improvement over prior art antennas in which transmission is nullified by dumping the signal into a resistive load, because such prior art antennas produce spurious, undesirable phase-differential backscatter that spreads from the sides of the antenna.

When switch 3 is OFF, patches 1 and 2 are unconnected and act independently, producing backscatter by forming a 2-element, combined antenna array that will reflect the transmitted signal back in a backscatter-modulated form.

Feeding both patches 1 and 2 through centrally located switch 3 as shown in FIG. 1 takes less board or chip space than prior art antennas that had only one patch fed from its center. With prior art dipole antennas, the RF ground plane had to be spaced well away from the plane of the radiating element to match the antenna impedance and provide sufficient backscatter. This spacing sometimes required that the antenna be one inch thick. The microstrip patch antenna of the invention does not require such spacing because the patches radiate signals from their edges rather than along the entire length of the printed circuit element, as is the case with dipole antennas. Thus, use of the microstrip patch antenna allows for a much thinner transponder design, with thickness being reduced from one-quarter to one-half wave length as was common in prior art antennas to a small fraction of a wave length, such as approximately one-twentieth of a wave length.

As shown in FIG. 1, detect devices 4 and 5 are connected to patches 1 and 2, respectively, on the side of the patch opposite the connection to switch 3. In the preferred embodiment, detect devices 4 and 5 are zero bias Schottky diodes. Other devices, such as planar doped barrier diodes, also may be used. Detect devices 4 and 5 are used to receive both data to be written into the transponder and signals to control the operation of the transponder, such as the signal that ultimately turns switch 3 on and off. Because detect devices 4 and 5 are attached directly to patches 1 and 2 and are located remote from switch 3, they are isolated from the transponder's modulating signal, thus reducing interference and improving signal detection. Thus, the invention allows data to be written into the transponder's memory even while the transponder antenna is turned on. This represents a significant improvement over prior art antennas that either required the antenna to be turned off before data could be written into the transponder's memory or used different frequencies, different polarization or different antennas for the transponder's read and write functions.

Locating detect devices 4 and 5 on the outside of patches 1 and 2 also reduces the amount of board or chip space required to accommodate the transponder circuit, which facilitates placement of the transponder in small areas or on small objects. In addition, the use of two detect lines, one to each patch, in combination with the switching between patches represents an improvement over prior art antennas that used only a single line (to a single dipole antenna).

Figure 2:
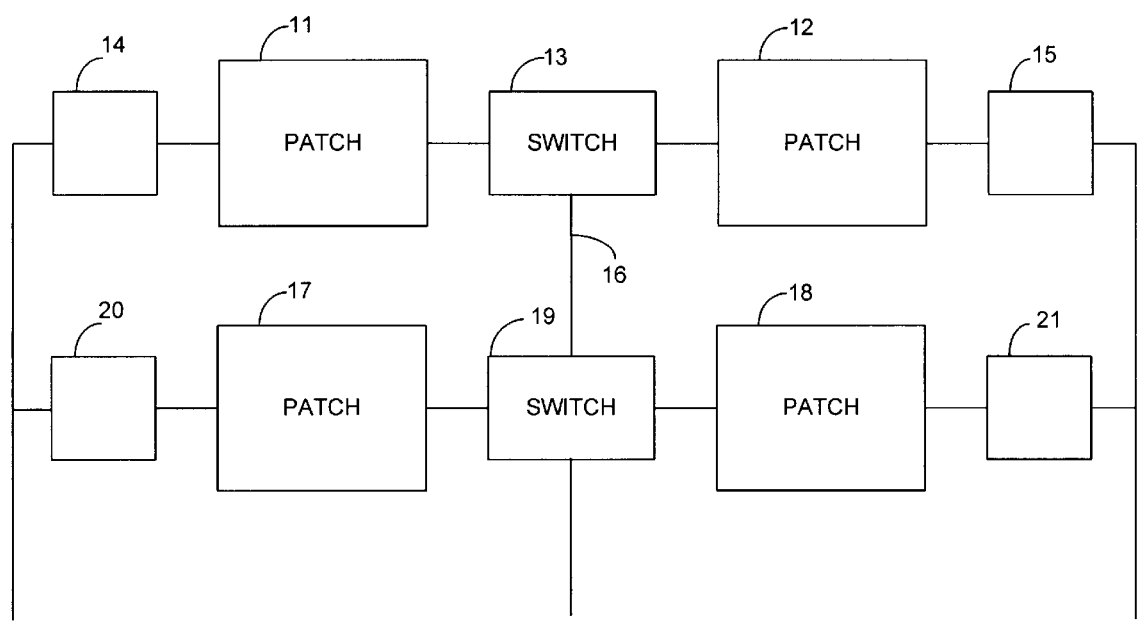
FIG. 2 is a schematic diagram of an alternative embodiment of the invention.

In an alternative embodiment, a plurality of pairs of patches are connected together to make a single antenna. Multiple pairs can be switched simultaneously in "gangs," each pair having its own switch. In FIG. 2, for example, patches 11 and 12 are connected through switch 13 as in FIG. 1. In addition, patches 17 and 18 are connected through switch 19. Patches 17 and 18 are preferably (but not necessarily) substantially the same as patches 11 and 12. Switch 19 is controlled by the same modulating signal that controls switch 13 and is received through line 16, thus insuring that both pairs of patches will be switched simultaneously. Detect devices 20 and 21 are connected to patches 17 and 18, respectively, and are used to receive data in the same way that detect devices 14 and 15 are used by patches 11 and 12, respectively. The use of multiple pairs increases the signal power level of the antenna when all switches are in the OFF position so as to produce backscatter.

Figure 3:
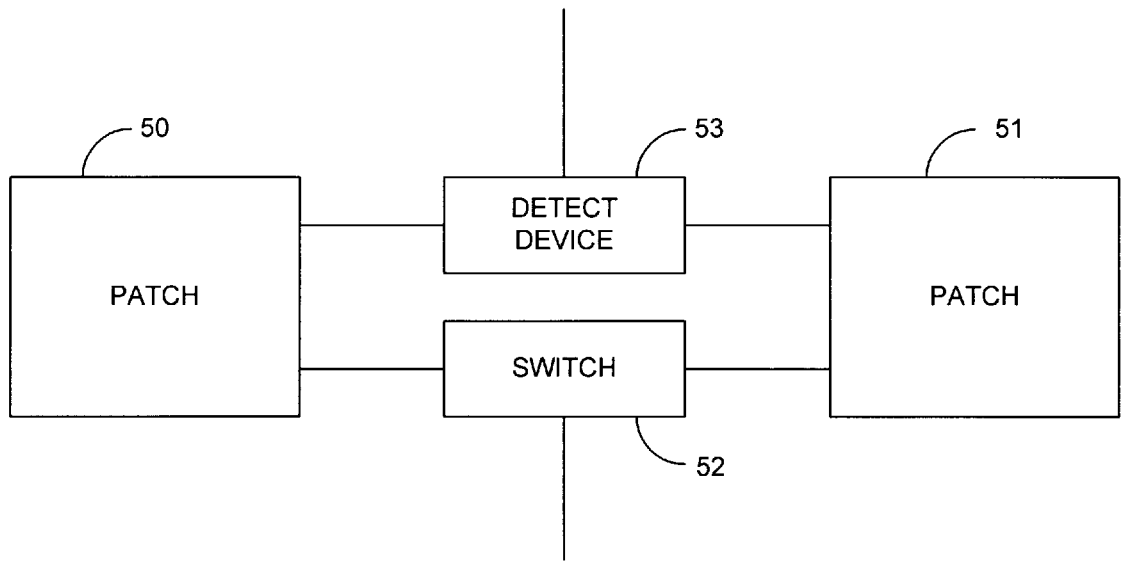
FIG. 3 is a schematic diagram of another alternative embodiment of the invention.

In the alternative embodiment of FIG. 3, a single detect device 53 is located between and connected to patches 50 and 51. Switch 52 and detect device 53 may be separate devices or combined into a single device. The embodiment of FIG. 3 is particularly useful in applications where a minimum of board or chip space is available. However, due to the close proximity of detect device 53 and switch 52, the embodiment of FIG. 3 does not reduce interference or improve signal detection to the same degree as the preferred embodiment.

As will be understood by those skilled in the art, many changes in the apparatus and methods described above may be made by the skilled practitioner without departing from the spirit and scope of the invention, which should be limited only as set forth in the claims which follow.

I claim:

1. A microstrip patch antenna for emitting backscatter-modulated signals at a fundamental frequency in response to a received signal from a reader, said antenna comprising:

two one-half wavelength segments, at least one of which has an input line for receiving an external signal;

a switch connecting each of the two one-half wavelength segments together at one end and having a closed position and an open position;

the two segments of the antenna being out-of-phase with each other when the switch is in the closed position, whereby no significant signal is reflected back to the reader, and the two segments of the antenna acting in concert when the switch is in the open position, thereby producing a backscatter-modulated signal at the fundamental frequency; and a switching circuit for actuating the switch between the open position and the closed position in response to the external signal.

2. A microstrip patch antenna according to claim 1 wherein said external signal is derived from the received signal.

3. A microstrip patch antenna according to claim 1 wherein the switching circuit contains a memory for holding received data, and wherein one of the one-half wavelength segments has an input line for writing data into the memory.

4. A microstrip patch antenna according to claim 3 wherein the external signal is for writing data into the memory.

5. A microstrip patch antenna according to claim 1 wherein both segments have input lines for receiving an external signal.

6. A microstrip patch antenna according to claim 5 wherein each of the input lines is located on one of the segments on a side opposite the switch.

7. A microstrip patch antenna according to claim 5 wherein each of the input lines is located in one of the segments on a side opposite the switch.

8. A microstrip patch antenna according to claim 1 wherein the input line is located on a side of one segment opposite the switch.

9. A microstrip patch antenna according to claim 1 wherein each of the segments has circular polarization.

10. A microstrip patch antenna assembly, comprising:

a first segment;

a second segment;

a switch coupled to the first segment and to the second segment, the switch having an open position and a closed position;

wherein one of the first segment and the second segment includes an input line for receiving an external signal;

wherein the first segment is coupled to the second segment when the switch is in the closed position and the first segment is electrically isolated from the second segment when the switch is in the open position; and wherein the microstrip patch antenna assembly generates a backscatter pattern comprising a series of nulls and peaks in response to a received signal and according to the closing and opening of the switch.

11. A microstrip patch antenna assembly according to claim 10 wherein the first segment and the second segment are each one-half wavelength segments connected together at one end by the switch.

12. A microstrip patch antenna assembly according to claim 10 wherein the switch opens and closes in response to an external signal.

13. A microstrip patch antenna assembly according to claim 10 wherein the external signal is incorporated in the received signal.

14. A microstrip patch antenna assembly according to claim 10 further comprising a temporary memory for storing data from the received signal.

15. A microstrip patch antenna assembly according to claim 10 wherein both the first segment and the second segment have separate input lines for receiving an external signal.

16. A microstrip patch antenna assembly according to claim 10 wherein each of the first segment and second segment has circular polarization.

* * * * *